United States Patent
Bergman

(10) Patent No.: US 10,044,609 B2
(45) Date of Patent: *Aug. 7, 2018

(54) COMMUNICATION PATH SELECTION FOR CONTENT DELIVERY

(71) Applicant: Fastly, Inc., San Francisco, CA (US)

(72) Inventor: Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/488,832

(22) Filed: Sep. 17, 2014

(65) Prior Publication Data

US 2015/0222536 A1     Aug. 6, 2015

Related U.S. Application Data

(60) Provisional application No. 61/935,640, filed on Feb. 4, 2014.

(51) Int. Cl.
*H04L 12/721* (2013.01)
*H04L 12/26* (2006.01)
*H04L 29/12* (2006.01)

(52) U.S. Cl.
CPC .......... *H04L 45/70* (2013.01); *H04L 43/0852* (2013.01); *H04L 43/16* (2013.01); *H04L 61/1511* (2013.01)

(58) Field of Classification Search
CPC ..... H04L 43/0852; H04L 43/16; H04L 45/70; H04L 61/1511; H04L 61/2007; H04L 61/2046; H04L 45/123; H04L 45/124; H04L 45/125; H04L 67/025; H04L 61/02; H04L 61/2076; H04L 61/2092; H04L 65/80; H04L 29/0818; H04L 29/08189; H04L 29/08243; H04L 29/0827; H04L 29/08288; H04L 29/12066
See application file for complete search history.

(56) References Cited

U.S. PATENT DOCUMENTS

| | | | |
|---|---|---|---|
| 8,427,958 | B2 | 4/2013 | Ko et al. |
| 8,745,177 | B1 * | 6/2014 | Kazerani ................ H04L 43/08 370/389 |
| 9,075,660 | B2 * | 7/2015 | Guo ...................... G06F 9/5027 |

(Continued)

FOREIGN PATENT DOCUMENTS

WO      2012167106 A1      12/2012

*Primary Examiner* — Greg C Bengzon

(57) ABSTRACT

Disclosed herein are methods, systems, and software for modifying a communication path based on content delivery performance data. In one example, a method of operating a content server that hosts content to be provided to a plurality of end user devices includes identifying latency data for a plurality of end user devices communicating with the content server, and identifying that the one or more end user devices in the plurality of end user devices exceed a latency threshold based on the latency data. The method further includes, in response to identifying that the one or more end user devices in the plurality of end user devices exceed the latency threshold, modifying the communication path between the content server and the one or more end user devices by modifying a domain name system (DNS) configuration for the content server.

26 Claims, 5 Drawing Sheets

(56) References Cited

U.S. PATENT DOCUMENTS

| | | | |
|---|---|---|---|
| 2003/0039212 A1* | 2/2003 | Lloyd | H04L 41/0823 370/235 |
| 2004/0249971 A1* | 12/2004 | Klinker | H04L 29/12066 709/239 |
| 2006/0187820 A1* | 8/2006 | French | H04L 29/12066 370/227 |
| 2007/0050522 A1 | 3/2007 | Grove et al. | |
| 2008/0056207 A1* | 3/2008 | Eriksson | H04L 12/66 370/338 |
| 2009/0019143 A1* | 1/2009 | Frutiger | G06F 9/5083 709/223 |
| 2009/0172192 A1* | 7/2009 | Christian | H04L 29/12132 709/242 |
| 2010/0226372 A1* | 9/2010 | Watanabe | H04L 29/12066 370/392 |
| 2011/0055312 A1* | 3/2011 | Purdy, Sr. | H04L 29/12066 709/203 |
| 2011/0082931 A1* | 4/2011 | Wang | H04L 29/12066 709/224 |
| 2011/0173339 A1* | 7/2011 | Zhang | H04L 12/66 709/229 |
| 2012/0054265 A1 | 3/2012 | Kazerani et al. | |
| 2012/0079115 A1 | 3/2012 | Richardson et al. | |
| 2012/0110148 A1 | 5/2012 | Liu et al. | |
| 2012/0265900 A1* | 10/2012 | Richardson | H04L 29/12066 709/242 |
| 2013/0212266 A1* | 8/2013 | Lyon | H04L 41/00 709/224 |
| 2014/0047109 A1* | 2/2014 | Santoro | H04L 29/12066 709/224 |
| 2014/0089503 A1* | 3/2014 | Thyni | H04L 41/0668 709/224 |
| 2014/0108672 A1* | 4/2014 | Ou | H04L 61/1511 709/238 |
| 2014/0143438 A1* | 5/2014 | Kagan | H04L 65/607 709/231 |
| 2014/0149552 A1* | 5/2014 | Carney | H04L 67/32 709/219 |
| 2014/0149601 A1* | 5/2014 | Carney | H04L 67/1097 709/238 |
| 2014/0164584 A1* | 6/2014 | Joe | H04L 67/06 709/223 |
| 2014/0207818 A1* | 7/2014 | Jellick | H04L 41/082 707/771 |
| 2014/0280963 A1* | 9/2014 | Burbridge | H04L 61/1511 709/226 |
| 2014/0289303 A1* | 9/2014 | Tarricone | H04L 67/10 709/201 |
| 2014/0289420 A1* | 9/2014 | Tarricone | H04L 67/10 709/227 |
| 2015/0382055 A1* | 12/2015 | Dua | H04L 29/06027 725/88 |
| 2017/0163755 A1* | 6/2017 | Slocombe | H04L 67/288 |

* cited by examiner

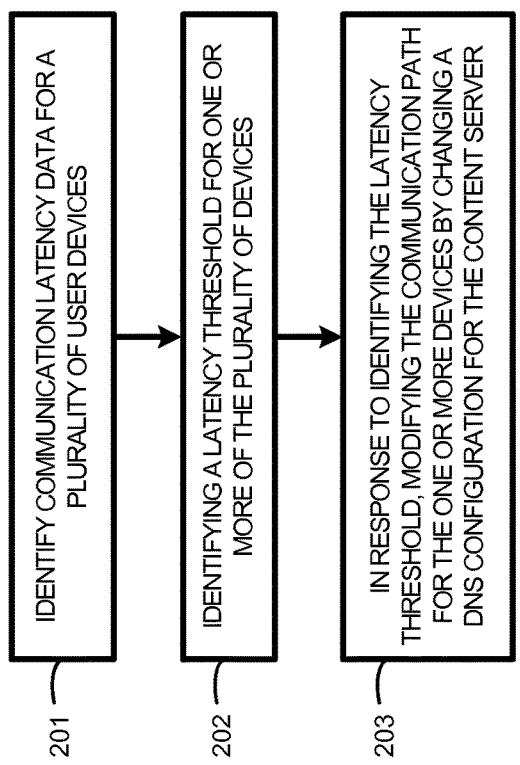

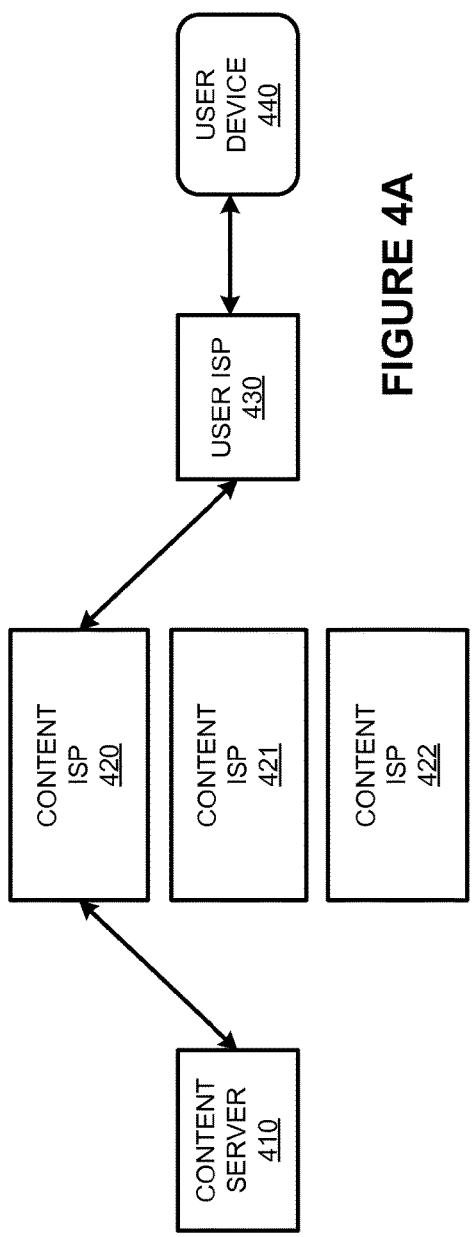
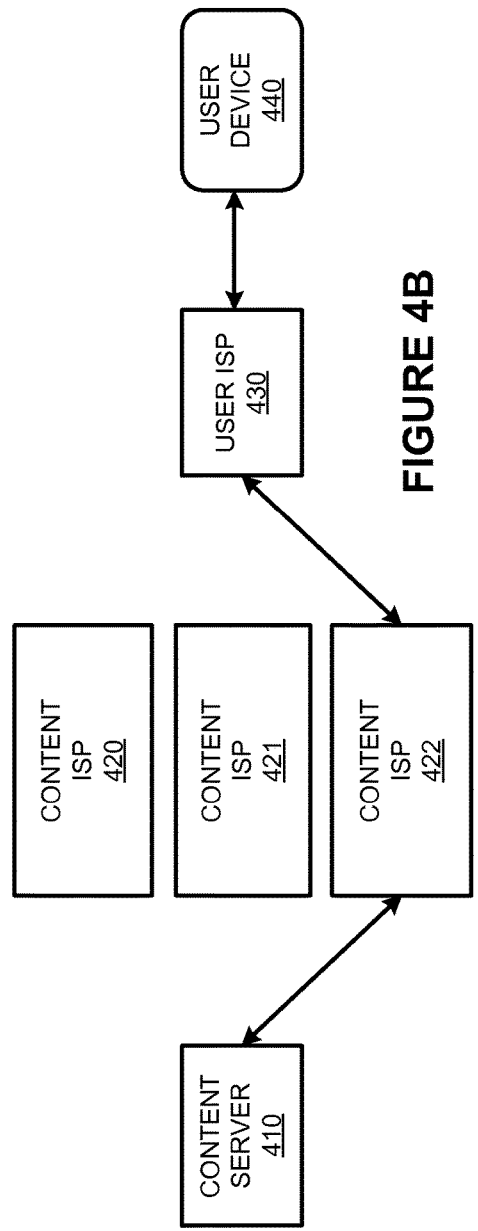

COMMUNICATION PATH SELECTION FOR CONTENT DELIVERY

RELATED APPLICATIONS

This application hereby claims the benefit of and priority to U.S. Provisional Patent Application 61/935,640, titled "LATENCY ADJUSTED COMMUNICATION PATH," filed Feb. 4, 2014, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network-provided content are processed and the content is responsively provided over various network links and Internet service providers (ISPs) from the networked computer system to the end user device. In some examples, the networked computer systems may include origin hosting servers which originally host network content of content creators or originators, such as web servers for hosting a news website.

During a communication request, a user device may contact a domain name server (DNS) to determine the location of the desired content. The DNS is configured to translate an alphanumeric request, such as www.alpha.com, into an Internet Protocol (IP) address. Once the address is determined, the user device may contact the addressed server over the various links and ISPs. In return, the networked computer system is configured to identify the request, and return the desired content to the end user device. Further, in some instances, the end user device may use the IP address provided by the DNS to upload or provide data to the networked computing system.

OVERVIEW

Examples disclosed herein provide methods, systems, and software for modifying a communication path based on content delivery performance data. In one example, a method of operating a content server that hosts content to be provided to a plurality of end user devices includes, identifying latency data for a plurality of end user devices communicating with the content server, and identifying that the one or more end user devices in the plurality of end user devices exceed a latency threshold based on the latency data. The method further includes, in response to identifying that the one or more end user devices in the plurality of end user devices exceed the latency threshold, modifying the communication path between the content server and the one or more end user devices by modifying a domain name system (DNS) configuration for the content server.

In another example, a computer apparatus to operate a content server that hosts content to be provided to a plurality of end user devices includes, processing instructions that direct the content server to identify latency data for the plurality of end user devices communicating with the content server, and identify that the one or more end user devices in the plurality of end user devices exceed a latency threshold based on the latency data. The processing instructions further direct the content server to, in response to identifying that the one or more end user devices in the plurality of end user devices exceed the latency threshold, modify a communication path between the content server and the one or more end user devices by modifying a DNS configuration for the content server. The computer apparatus further includes one or more non-transitory computer readable media that store the processing instructions.

In a further instance, a system to alter a communication path between one or more end user devices and a content server that hosts content to be provided to a plurality of end user devices includes a DNS configured to provide Internet Protocol (IP) addresses to the plurality of end user devices based on a DNS configuration for the content server. The system further includes the content server configured to identify content delivery performance data for the plurality of end user devices communicating with the content server, and identify that the one or more end user devices in the plurality of end user devices meet a performance condition based on the content delivery performance data. The content server is further configured to, in response to identifying that the one or more end user devices in the plurality of end user devices meet the performance condition, modify the communication path between the content server and the one or more end user devices by transferring, for delivery to the DNS, a DNS modification notification regarding the DNS configuration for the content server.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 is a flow diagram illustrating the operation of a communication system.

FIG. 3 is a data structure illustrating latency between end user devices and content servers.

FIG. 4A is an overview illustrating the operation of a communication system.

FIG. 4B is an overview illustrating the operation of a communication system.

DESCRIPTION

User devices may include applications or other software that require network content from content servers. This content may include text, hypertext markup language (HTML) pages, pictures, video, audio, code, scripts, or other content viewable by an end user in a browser or other application. The network content includes example website content referenced in FIG. 1, such as "www.gamma.gov," "www.alpha.com," and "www.beta.net," among others.

In the present example, user devices may connect to the content servers using plurality of Internet Service Providers (ISPs) that pass the required data from one provider to the next. Each content server may be connected to multiple ISPs that are each provided with a unique IP address for the server. In turn, the ISPs may be connected to other network devices and ISPs that provide data communications to the end user devices. As a result of the multiple ISPs communicating with the content server, a user device may have options in routing the communications from the content providing servers to the user device, and may prefer to select the path based on the delivery performance of the communication path.

In one instance, a method of altering communication paths for the end user devices comprises identifying content delivery performance data, which may include the content server ISP identifier, the IP address for the end user device, the latency of data communications with the content server, or any other similar data related performance information. The content ISP is the ISP that is in direct connection with the content server, and may be identified by the unique IP address that the ISP uses to contact the server. With these determinations, a change can be made in the path between the content server and the user device to provide the fastest connection, such as changing the content ISP for communications with the user device.

Figure 1:
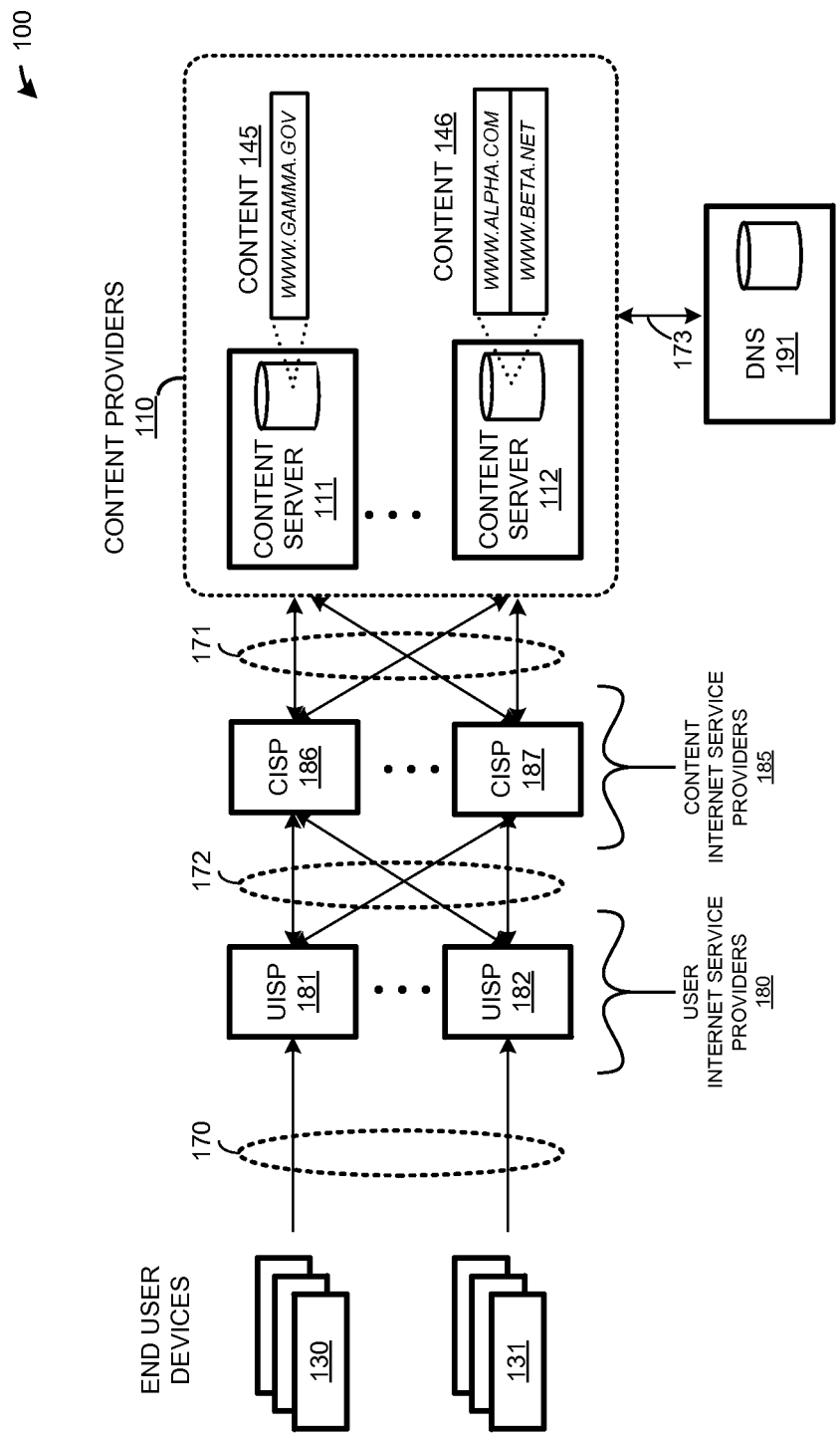
FIG. 1 is a system diagram illustrating a communication system.

To further illustrate the adjusting of communication paths based on delivery performance data, FIG. 1 is included. FIG. 1 illustrates a communication system 100 that allows changes in a communication path based on data latency. System 100 includes content providers 110, end user devices 130-131, DNS 191, user internet service providers (UISP) 180, and content internet service providers (CISP) 185. Each of content servers 111-112 can include one or more data storage systems that allow the storage of content, such as content 145-146. End user devices 130-131 are representative of a plurality of end user communication devices that can request and receive network content. It should be understood that any number of end user devices 130-131 might request data from content servers 111-112. UISPs 181-182 and end users 130-131 communicate over associated network links 170. CISPs 186-187 communicate with content servers 111-112 over communication links 171, and content servers 111-112 further communicate with DNS 191 over communication link 173. UISPs 181-182 communicate with CISPs 186-187 over communication links 172. Although illustrated in direct communication, it should be understood that UISPs 180 and CISPs 185 might have one or more intermediary internet service providers.

To further illustrate FIG. 1, a brief description of the operation of communication system 100 is included. In operation, end user devices 130-131 request network content, such as content 145-146 associated with content servers 111-112. To fulfill the requests, the content servers are configured to pass the content to the appropriate CISP, which will in turn communicate the content to the UISP and the end user device.

In the present example, each content server 111-112 may be configured with multiple IP addresses to communicate with different internet service providers. For example, content server 111 may include a first IP address to communicate with CISP 186, but may be configured with an alternative IP address to communicate with CISP 187. As a result, there may be options in the communication path between content server 111 and an end user device.

To direct the communications between the content server and the end user devices, DNS 191 is included to provide translations of domain names into IP addresses for user devices 130-131. In operation, when end user devices 130-131 require content from a domain name, user devices 130-131 will contact a DNS, such as DNS 191, to translate alphanumeric domain names to numerical network address. As demonstrated in FIG. 1, if one of user device 130-131 requires content from www.delta.com, DNS 191 will return the configured network address for the domain name. From this numerical address, a content request can be made to the appropriate content server over a content internet service provider.

Turning now to FIG. 2, FIG. 2 illustrates a method of configuring data paths for end user devices based on delivery performance data, such as latency. In operation, user devices may communicate with content providers 110 to receive various data and information from content servers 111-112. Content servers 111-112 may be configured with multiple IP addresses that allow each CISP 186-187 to address the content servers individually. For example, CISP 186 may have a different IP address for content server 111 than CISP 187, allowing the end user devices to address the same content server using different communication paths.

By providing multiple IP addresses for the same content server, the communication system is capable of adjusting the communication path for the user device based on the delivery performance provided for each of the paths. To accomplish this task, each content server is configured to gather performance information, such as latency data, for the plurality of devices that attempt to communicate with the content server (201). This latency data may include a variety of information, such as the IP address for the requesting user device, the identity of the CISP that is making the request to the content server, as well as the latency or time for the data request to be processed. Based on the latency data, the content server is configured to determine that one or more of the user devices have met or exceeded a latency threshold (202). The latency threshold may be determined based on a comparison to the latency of other devices, a predefined threshold by an administrator of the system, or any other possible latency threshold. In response to the identification of the latency threshold, the content server is configured to adjust the communication path for the one or more user devices by changing the path between the content server and the CISP (203). As a result, although the user device may be routed through the same user ISP, the user ISP may be communicating directly or indirectly with an alternative CISP. This may allow the avoidance of any problems that may have existed between the user ISP and the first CISP.

For example, user device 130 may be communicating with content server 111 using UISP 181 and CISP 186. At one point, content server 111 may identify that the communication latency between the user device and content server 111 is above a certain threshold. To accommodate this problem, content server 111 may configure DNS 191 to change the IP address associated with content server 111 to an IP addresses used by CISP 187. This alternative IP address is still used by content server 111, but allows the communication path for the user device to change, potentially avoiding a problem within the communication system. Accordingly, user device 130 may communicate with content server 111 using UISP 181 and CISP 187 to avoid any communication issues between UISP 181 and CISP 186.

Turning now to FIG. 3, FIG. 3 illustrates a data structure 300 for determining latency between a user device and content server. Data structure 300 is illustrated as a table in the present example, but it should be understood that data structure 300 might take the form of tree, linked list, or any other structure capable of maintaining latency information about a plurality of user devices. Data structure 300 includes device IP address 310, content ISP 312, and latency 314 that manages latency data 320.

In operation, a content server, such as content server 111, may be configured to monitor the latency of data accesses for a plurality of user devices. In doing so, the content server may be configured to determine IP addresses for the user devices, content ISP identifiers, and latency data for the various communications. The content ISP identifiers are used to identify the various ISPs that can communicate directly with the content server. These ISPs are provided with separate IP addresses for the serving device, which allows different paths between user devices and the content on the server.

As illustrated in FIG. 3, pluralities of user devices are connected to the content server using two separate content ISPs, alpha and beta. These ISPs each connect with the content server using different IP addresses, such that the address used by alpha is not the same as the address used by beta. As the content server gathers the latency data 320, the node may determine that a threshold latency value has been reached in the data accesses. This threshold latency value may be specified by an administrator of the system, may be based in comparison to the latency of other data accesses to the server, or may be based on any other threshold determination. Once the threshold value has been attained, the content server is configured to change the communication path between the user device and content server. For instance, the content server may modify a DNS configuration to change the communication path from passing through ISP alpha to passing through ISP beta. As a result, the communication latency may improve if there were any issues in the original path.

FIGS. 4A and 4B illustrate an overview of changing a communication path based on latency. The overview includes content server 410, content ISPs 420-422, user ISP 430, and user device 440. As illustrated in FIG. 4A, user device 440 may initiate a communication with content server 410 using user ISP 430 and content ISP 420. During this communication, content server 410 may monitor delivery performance data, such as latency or timing information, for user device 440, as well as the performance data for a plurality of other user devices. Based on the performance information, content server 410 may identify that the device meets a performance condition to change the communication path between the user devices and the content server. This condition or threshold may be preset by an administrator, may be based on a comparison with other latency values, or may be determined by any similar measurement.

Once it is determined that the communication between user device 440 and content server 410 meets the condition or exceeds the threshold, content server 410 is configured to modify the communication path for the user device. In some examples, content server 410 may define IP groups for the user devices that are affected by the latency or performance of the communication. These IP groups may be defined by a range of IP addresses that likely share a user ISP provider or that may be routed through the same or similar connection path in arriving at content server 410. Accordingly, content server 410 may be configured to change the communication path for all similar or related devices in the IP group based on the attainment of a performance condition by at least one of the devices.

As illustrated in FIG. 4B, user device 440 is transitioned to communicating with content server 410 using content ISP 422 and user ISP 430. To accomplish this task, content server 410 may be configured to change the IP address associated with content server 410 to route communications through content ISP 422 as opposed to content ISP 420. This transition may be used to avoid any possible obstacles that were slowing the communication using the previous path.

In some examples, content server 410 may be configured with multiple IP addresses that are associated with each content ISP. For example, content ISP 420 may be configured to communicate with content server 410 using a first IP address, and content ISP 422 may be configured to communicate with content server 410 using a second IP address. When a path transition occurs in response to meeting a performance condition or exceeding a latency threshold, the IP address that is given to user device 440 by a DNS may be changed to direct the user device communications through content ISP 422. Thus, the IP address provided to the users by the DNS may be the second IP address as opposed to the first IP address to improve latency in content communications.

Figure 5:
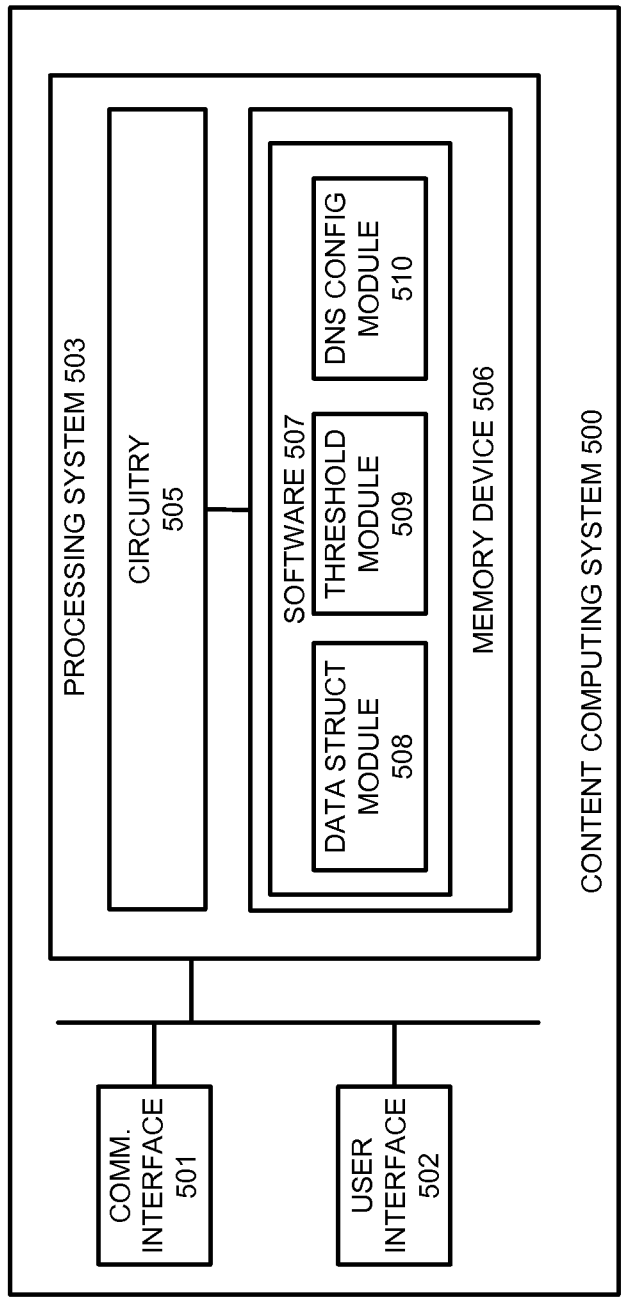
FIG. 5 is a content computing system for supplying content to end user devices.

Turning now to FIG. 5, FIG. 5 illustrates a content computing system 500 with the ability to change communication paths based on latency data. Content computing system 500 is an example content server from FIGS. 1-4, although other content server examples may exist. Content computing system 500 may comprise a real or virtual computing device or system of devices. Content computing system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 may communicate with end user devices over one or more ISPs, and also communicate with a DNS that provides IP addresses to the end user devices.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes data structure module 508, threshold module 509, and DNS configuration module 510. Operating software 507 may further include an operating system, utilities, drivers, network interfaces, applications, or some other type of software. When executed by circuitry 505, operating software 507 directs processing system 503 to operate content computing system 500 as described herein.

In particular, content computing system 500 is used to provide hosted original data content to one or more end user devices. To accomplish this task, computing system 500 may be assigned a plurality of IP addresses that are accessible using a corresponding plurality of ISPs. As a result, each of the ISPs may connect to computing system 500 using distinct IP addresses for the computing system.

As the end user devices connect to computing system 500, data structure module 508 is configured to identify performance information, such as latency data, for the user devices. This data may include the IP address for each connecting user device, the content ISP that is connecting computing system 500, as well as performance or latency timing for providing content to the user devices. As the information is collected, threshold module 509 may be configured to identify that one or more of the connecting user devices exceed a latency threshold or meet a performance condition. In some examples, the one or more user devices that exceed the threshold or meet the condition may be from a similar range of device IP addresses. Accordingly, computing system 500 may determine that the range of IP addresses connect using the same user ISP.

Once the threshold or condition is identified, DNS configuration module 510 is configured to adjust the communication path for the one or more identified user devices. For instance, because computing system 500 determines that certain IP addresses are having issues with performance, computing system 500 may configure a DNS to direct the affected devices to the computing system using an alternative content ISP. As a result, the end user device may connect to the same user ISP, but the path to computing system 500 will be different with the alternative content ISP.

Although illustrated in the present example with three software modules, it should be understood that any number of software modules might be used to provide the path adjustment functions described herein.

Figure 6:
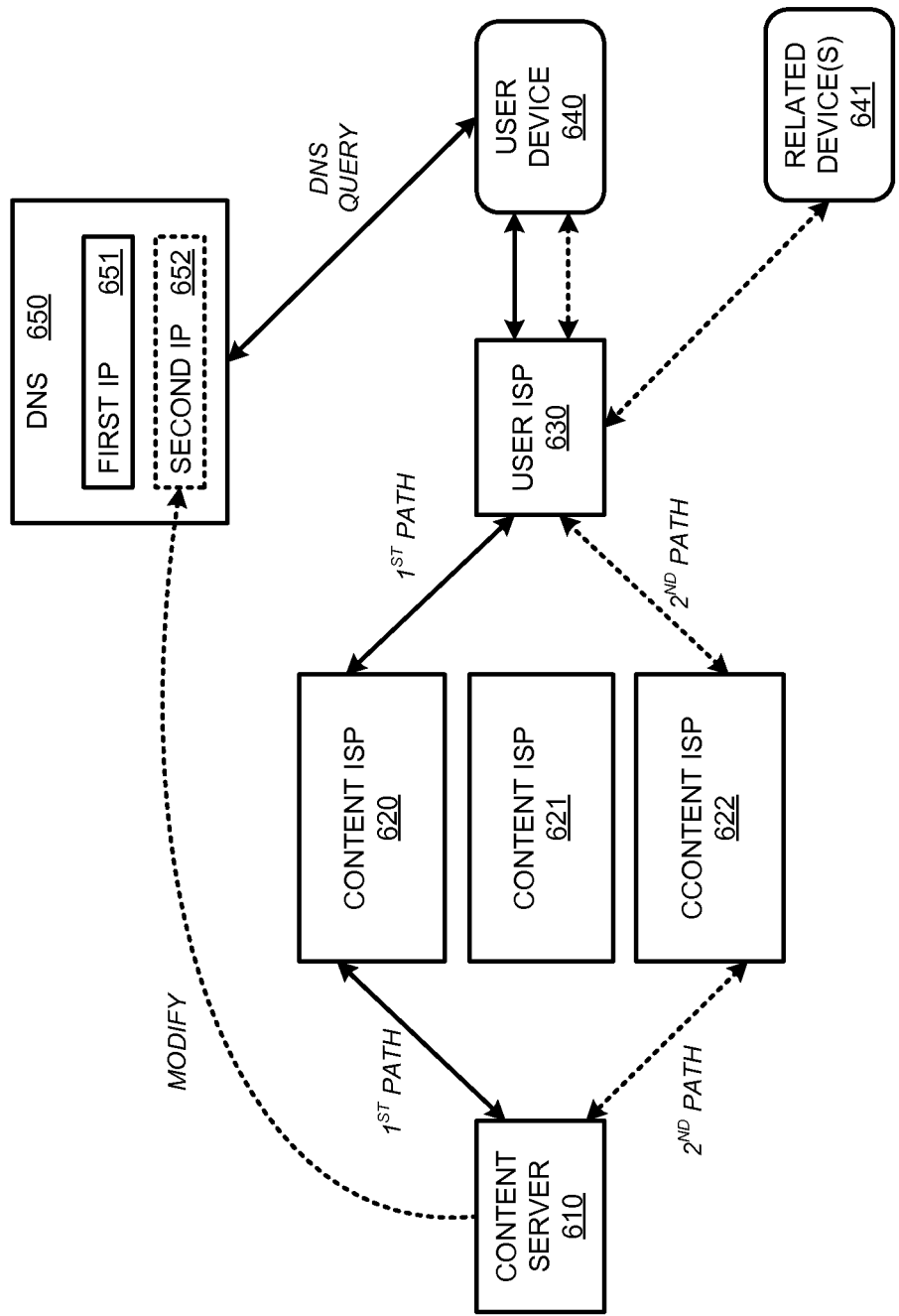
FIG. 6 is an overview illustrating the operation of a communication system.

Referring to FIG. 6, FIG. 6 illustrates an overview of operating a communication system according to one example. FIG. 6 includes content server 610, content ISPs (620-622), user ISP 630, end user devices 640-641, and DNS 650.

In operation, DNS 650 is used to provide end user devices 640-641 with network IP addresses that allow the devices to communicate with external servers and systems. For example, if the user desired to visit a website, such as www.alpha.com, DNS 650 would associate the domain name of the site to the appropriate IP address. In the present instance, end user device 640 initiates a content request for content that is stored on content server 610. Responsive to the request, DNS 650 provides first IP address 651, which directs communications from end user device 640 across the network, including at least content ISP 620 and user ISP 630, to content server 610. As content is provided to end user device 640, content server 610 maintains content delivery performance data for providing content to the end user devices. This delivery performance data may include the amount of time for a request to be received by content server 610, the amount of time for content to be requested and delivered to end user device 640, or any other similar performance metrics between content server 610 and end user device 640.

Based on the delivery performance information gathered about the communications, content server 610 may identify that one or more of the communicating devices meet a latency or performance condition, which may be predefined by an administrator, based on a relationship to other communications on content server 610, or any other threshold measurement. In the present example, content server 610 identifies that the performance data for end user device 640 has met a performance condition for the communication. Accordingly, content server 610 modifies the DNS configuration at DNS 650 by including second IP address 652. Once the configuration is modified, future DNS requests by end user device 640 will direct the device to content server 610 using second IP address 652. In the present example, by changing to second IP address 652, the communication path from content server 610 to end user device 640 is modified to carry communications over content ISP 622 rather than content ISP 620. As a result, the new path intends to overcome possible obstacles that may have slowed performance or increased latency between the end user device and the content server by using the alternative ISP path.

Also illustrated in FIG. 6 is the second path transformation for related end user devices 641. Content server 610 classifies these devices as similar to end user device 640 and, thus, the path for these devices is modified in the same way as end user device 640. In some examples, content server 610 may classify devices within a range of IP addresses as being effected by the performance or latency issues. As a result, when end user device 640 reaches the performance condition, a range of IP addresses near the IP address for end user device 640 may also have their path redirected. In some examples, the range of IP addresses attempts to account for the range of devices that connect using user ISP 630, although the range of end user devices to be affected may connect using multiple user ISPs Returning to FIG. 1, content servers 111-112, UISPs 181-182, CISPs 186-187, and DNS 191 can each include communication interfaces, network interfaces, processing systems, computer systems, microprocessors, storage systems, storage media, or some other processing devices or software systems, and can be distributed among multiple devices.

End user devices 130-131 can include subscriber equipment, customer equipment, access terminal, smartphone, personal digital assistant (PDA), computer, tablet computing device, e-book, Internet appliance, media player, game console, or some other user communication apparatus, including combinations thereof. End user devices 130-131 are configured to communicate with content servers 111-112 over UISPs 181-182 and CISP 186-187. Although the endpoint ISPs are illustrated in the present example, it should be understood that communication links 172 may comprise any number of ISPs to route communications between the user devices and the content servers.

Communication links 170-173 each use metal, glass, optical, air, space, or some other material as the transport media. Communication links 170-173 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-173 can each be a direct link or can include intermediate networks, systems, or devices, and can include a logical network link transported over multiple physical links. Although one main link for each of links 170-173 is shown in FIG. 1, it should be understood that links 170-173 are merely illustrative to show communication modes or access pathways. In other examples, further links can be shown, with portions of the further links shared and used for different communication sessions or different content types, among other configurations. Communication links 170-173 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a content server that hosts network content, the method comprising:
   identifying, latency data associated with communication between the content server and a first content delivery internet service provider (CDISP) and communication between the first CDISP and a plurality of end user devices;
   identifying an end user device in the plurality of end user devices that exceeds a latency threshold based on the latency data; and
   in response to identifying the end user device in the plurality of end user devices that exceeds the latency threshold:
   identifying a second CDISP; and
   modifying a domain name system (DNS) configuration for the content server, such that the communication path from the end user device to the content server goes through the second CDISP.

2. The method of claim 1 wherein the content server comprises an origin server.

3. The method of claim 1 wherein modifying the DNS configuration for the content server comprises modifying an Internet Protocol (IP) address provided to the end user device.

4. The method of claim 1 further comprising:
   identifying an additional end user device in the plurality of end user devices; and
   responsive to identifying the additional end user device, modifying the DNS configuration for the content server, such that a second communication path between the content server and the additional end user device goes through the second CDISP.

5. The method of claim 4 wherein altering the DNS configuration for the content server comprises altering an Internet Protocol (IP) address provided to the additional end user device for the content server.

6. The method of claim 4 wherein identifying the additional end user device in the plurality of end user devices comprises identifying the additional end user device using the same Internet Service Provider as the end user device.

7. The method of claim 4 wherein the end user device and the additional end user device comprise end user devices within a range of IP addresses.

8. The method of claim 1 wherein the latency data comprises at least timing information for satisfying content requests.

9. The method of claim 1 wherein the latency threshold comprises a predefined latency time for satisfying content requests.

10. A method of claim 1, further comprising:
    receiving a content request from an end user device from the plurality of end user devices;
    delivering the requested content through the second CDISP.

11. A computer apparatus to operate a content server that hosts network content, the computer apparatus comprising:
    processing instructions that direct the content server, when executed by the content server, to:
    identify latency data from communication between the content server and a first content delivery internet service provider (CDISP) and communication between the first CDISP and the plurality of end user devices;
    identify that an end user device in the plurality of end user devices that exceeds a latency threshold based on the latency data; and
    in response to identifying, that the end user device in the plurality of end user device that exceeds the latency threshold:
    identify a second CDISP; and
    modify a domain name system (DNS) configuration for the content server, such that a communication path from the end user device to the content server goes through the second CDISP; and
    non-transitory computer readable media that store the processing instructions.

12. The computer apparatus of claim 11 wherein the processing instructions to modify the DNS configuration for the content server, such that the communication path between the content server and the end user device to the content server goes through the second CDSIP further direct the content server to modify an Internet Protocol (IP) address provided to the end user device.

13. The computer apparatus of claim 11 wherein the processing instructions further direct the content server to:
    identify an additional end user device in the plurality of end user devices; and
    modify the DNS configuration for the content server, such that a second communication path between the content server and the additional end user device goes through the second CDISP.

14. The computer apparatus of claim 13 wherein the processing instructions to modify the DNS configuration for the content server, such that the second communication path between the content server and the additional end user device goes through the second CDISP further direct the content server to modify an Internet Protocol (IP) address provided to the additional end user device.

15. The computer apparatus of claim 13 wherein the processing instructions to identify the additional end user device in the plurality of end user devices direct the content server to identify the additional end user device using the same Internet Service Provider as the end user device.

16. The computer apparatus of claim 13 wherein the end user device and the additional end user device comprise end user devices within a range of IP addresses.

17. The computer apparatus of claim 11 wherein the latency data comprises at least timing information for satisfying content requests.

18. The computer apparatus of claim 11 wherein the latency threshold comprises a predefined latency time for satisfying content requests.

19. The computer apparatus of claim 11 wherein the processing instructions further direct the content server to:
receive a content request from an end user device from the plurality of end user devices;
deliver the requested content through the second CDISP.

20. A system having a content server that hosts content to be provided to a plurality of end user devices, the system comprising:
a domain name system (DNS) configured to provide Internet Protocol (IP) addresses to the plurality of end user devices based on a DNS configuration for the content server; and
the content server configured to:
identify content delivery performance data from communication between the content server and a first content delivery internet service provider (CDISP) and communication between the first CDISP and the plurality of end user devices;
identify an end user device in the plurality of end user devices that meets a performance condition based on the content delivery performance data; and
in response to identifying that the end user device in the plurality of end user devices meets the performance condition:
identify a second CDISP; and
transferring to the DNS, a DNS modification notification regarding the DNS configuration for the content server, the DNS modification notification comprises instructing the DNS to modify the DNS configuration for the content server, such that a communication path from the end user device to the content server goes through the second CDISP by.

21. The system of claim 20 wherein the content delivery performance data comprises at least timing information for satisfying content requests.

22. The system of claim 20 wherein the DNS modification notification comprises a notification to change the IP address provided to the end user device.

23. The system of claim 20, wherein the content server configured to:
receive a content request from an end user device from the plurality of end user devices;
deliver the requested content through the second CDISP.

24. A method of operating a content server that hosts network content, the method comprising:
Identifying latency data from communication between the content server and a first content delivery internet service provider (CDISP) and communication between the first CDISP and the plurality of end user devices, wherein a first Internet Protocol (IP) address is associated with the first CDISP;
receiving a content request from an end user device from the plurality of end user devices;
identifying an end user device in the plurality of end user devices that exceeds a latency threshold based on the latency data; and
in response to identifying the end user device in the plurality of end user devices that exceeds the latency threshold:
identifying a second IP address associated with a second CDISP; and
modifying a domain name system (DNS) configuration for the content server, such that the communication path from the end user device to the content server goes through the second CDISP;
delivering the requested content through the second CDISP.

25. A computer apparatus to operate a content server that hosts network content, the computer apparatus comprising:
processing instructions that direct the content server, when executed by the content server, to:
identify latency data from communication between the content server and a first content delivery internet service provider (CDISP) and communication between the first CDISP and the plurality of end user devices;
receive a content request from an end user device from the plurality of end user devices;
identify an end user device in the plurality of end user devices that exceeds a latency threshold based on the latency data; and
in response to identifying the end user device in the plurality of end user device that exceeds the latency threshold:
identify a second CDISP; and
modify a domain name system (DNS) configuration for the content server, such that a communication path from the end user device to the content server goes through the second CDISP; and
deliver the requested content through the second CDISP; and
non-transitory computer readable media that store the processing instructions.

26. A system having a content server that hosts content to be provided to a plurality of end user devices, the system comprising:
a domain name system (DNS) configured to provide Internet Protocol (IP) addresses to the plurality of end user devices based on a DNS configuration for the content server; and
the content server configured to:
identify content delivery performance data from communication between the content server and a first content delivery internet service provider (CDISP) and communication between the first CDISP and the plurality of end user devices;
receive a content request from an end user device from the plurality of end user devices;
identify an end user device in the plurality of end user devices that meets a performance condition based on the content delivery performance data; and
in response to identifying that the end user device in the plurality of end user devices meets the performance condition:
identify a second CDISP; and
transferring to the DNS, a DNS modification notification regarding the DNS configuration for the content server, the DNS modification notification comprises instructing the DNS to modify the (DNS) configuration for the content server, such that a communication path from the end user device to the content server goes through the second (CDISP); and
deliver the requested content through the second CDISP.

* * * * *